United States Patent
Gauthier

(10) Patent No.: US 9,352,742 B2
(45) Date of Patent: May 31, 2016

(54) TRACTION CHAIN FOR A HYBRID VEHICLE

(75) Inventor: Pierre Gauthier, Chaville (FR)

(73) Assignee: Technoboost (FR)

( * ) Notice: Subject to any disclaimer, the term of this patent is extended or adjusted under 35 U.S.C. 154(b) by 139 days.

(21) Appl. No.: 13/822,191

(22) PCT Filed: Sep. 7, 2011

(86) PCT No.: PCT/FR2011/052049
§ 371 (c)(1),
(2), (4) Date: Mar. 11, 2013

(87) PCT Pub. No.: WO2012/035237
PCT Pub. Date: Mar. 22, 2012

(65) Prior Publication Data
US 2013/0178329 A1    Jul. 11, 2013

(30) Foreign Application Priority Data
Sep. 16, 2010    (FR) ...................... 10 57413

(51) Int. Cl.
*B60W 20/00*    (2016.01)
*B60K 6/12*    (2006.01)
(Continued)

(52) U.S. Cl.
CPC .................. *B60W 20/10* (2013.01); *B60K 6/12* (2013.01); *B60K 1/00* (2013.01); *B60K 1/04* (2013.01); *B60K 6/00* (2013.01); *Y02T 10/6208* (2013.01); *Y02T 10/6282* (2013.01); *Y10T 477/23* (2015.01)

(58) Field of Classification Search
CPC .............. B60K 6/00; B60K 6/08; B60K 6/12; B60K 1/00; B60K 1/04; B60W 20/00; B60W 20/10; B60T 1/10; Y02T 10/6208; Y02T 10/6282; F15B 7/08; F15B 1/024; F15B 1/033; F15B 1/027; F16D 31/00
USPC ........ 180/305, 307, 69.6, 165, 65.21, 65.275; 60/325, 327, 413, 416, 421, 465; 477/3
See application file for complete search history.

(56) References Cited

U.S. PATENT DOCUMENTS 4,320,814 A * 3/1982 Middelhoven ................ 180/294
4,413,698 A * 11/1983 Conrad et al. ................ 180/305
(Continued)

FOREIGN PATENT DOCUMENTS

EP    0366095 A2    5/1990
FR    2707218 A1 *    1/1995
(Continued)

OTHER PUBLICATIONS

International Search Report from corresponding International Application No. PCT/FR2011/052049, mailed Jul. 16, 2012.

*Primary Examiner* — Paul N Dickson
*Assistant Examiner* — Steve Clemmons
(74) *Attorney, Agent, or Firm* — Polster Lieder

(57) ABSTRACT

The invention relates to a drive wheel traction chain for a hybrid vehicle comprising a heat engine and a hydraulic traction machine powered by hydraulic accumulators forming two power units that can be used to drive the drive wheels of the vehicle. The invention further comprises a recharge module including electricity storage batteries connected to an electric machine which drives a hydraulic recharge machine that powers the hydraulic accumulators, and a means for controlling the recharge module connected to the means for controlling the power units of the vehicle.

5 Claims, 2 Drawing Sheets

(51) Int. Cl.
*B60K 1/00* (2006.01)
*B60K 1/04* (2006.01)
*B60K 6/00* (2006.01)

(56) References Cited

U.S. PATENT DOCUMENTS

| | | | |
|---|---|---|---|
| 6,705,266 B2 * | 3/2004 | Tachikawa et al. | 123/179.3 |
| 6,971,463 B2 * | 12/2005 | Shore et al. | 180/165 |
| 6,973,782 B2 * | 12/2005 | Rose | 60/414 |
| 7,201,095 B2 * | 4/2007 | Hughey | 91/408 |
| 8,596,404 B1 * | 12/2013 | Stoner et al. | 180/307 |
| 8,616,323 B1 * | 12/2013 | Gurin | 180/305 |
| 2002/0178720 A1 * | 12/2002 | Berlinger et al. | 60/419 |
| 2005/0132701 A1 * | 6/2005 | Rose | 60/413 |
| 2008/0081724 A1 * | 4/2008 | Ivantysynova et al. | 475/129 |
| 2008/0083222 A1 * | 4/2008 | Hubert | 60/698 |
| 2008/0093152 A1 * | 4/2008 | Gray | 180/307 |
| 2008/0169139 A1 * | 7/2008 | Kramer | 180/65.2 |
| 2008/0238187 A1 * | 10/2008 | Garnett et al. | 303/112 |
| 2008/0314039 A1 * | 12/2008 | Gray et al. | 60/445 |
| 2009/0095549 A1 | 4/2009 | Dalum et al. | |
| 2009/0139788 A1 * | 6/2009 | Miller | 180/165 |
| 2009/0172942 A1 * | 7/2009 | Hindle | 29/888 |
| 2009/0173066 A1 * | 7/2009 | Duray | 60/413 |
| 2010/0151989 A1 * | 6/2010 | Read | 477/4 |
| 2010/0219007 A1 * | 9/2010 | Dalum et al. | 180/65.22 |
| 2010/0276221 A1 * | 11/2010 | Rose et al. | 180/165 |
| 2011/0003660 A1 * | 1/2011 | Grant | 475/116 |

FOREIGN PATENT DOCUMENTS

| | | |
|---|---|---|
| FR | 2957856 A1 * | 9/2011 |
| JP | 8282324 A | 10/1996 |
| WO | WO 9634213 A1 * | 10/1996 |
| WO | 2008033378 A1 | 3/2008 |

* cited by examiner

TRACTION CHAIN FOR A HYBRID VEHICLE

CROSS-REFERENCE TO RELATED APPLICATIONS

The present invention is the US national stage under 35 U.S.C. §371 of International Application No. PCT/FR2011/052049, which was filed on Sep. 7, 2011 and which claims the priority of application FR 1057413 filed on Sep. 16, 2010 the content of which (text, drawings and claims) is incorporated here by reference in its entirety.

TECHNICAL FIELD

The present invention concerns a traction chain comprising a hydraulic power unit, for a hybrid vehicle, as well as a hybrid vehicle outfitted with such a traction chain.

BACKGROUND

Hybrid vehicles generally have a heat engine constituting the main power unit of the vehicle, and a supplemental power unit utilizing energy that can be stockpiled, such as electric or hydraulic energy, to optimize the operation of the heat engine and reduce its consumption.

One known type of hybrid vehicle, presented in particular by the document JP-8282324, uses a heat engine constituting the main power unit, and a hydraulic machine connected to the drive wheels of the vehicle, being able to operate as a pump to charge hydraulic pressure accumulators, or as a motor to deliver a mechanical power to these drive wheels by withdrawing energy from the accumulators.

In this way, during the braking phases one can utilize the hydraulic machine as a pump to recharge the hydraulic accumulators, recovering the kinetic energy of the vehicle. One can also utilize the hydraulic machine as a motor by withdrawing pressurized fluid from the hydraulic accumulators, and furnishing a mechanical power that is added to the power delivered by the heat engine, for the traction of the vehicle.

This utilization of stockpiled hydraulic energy makes it possible to optimize the operation of the heat engine and to reduce its consumption, as well as the polluting gas emissions. The stockpiling of hydraulic energy also makes it possible to drive in hydraulic mode alone or zero emission "ZEV" mode, the heat engine remaining halted with a vehicle not emitting any polluting gas.

The problem that arises with this type of vehicle is that the quantity of energy stockpiled is limited by the capacity of the hydraulic accumulators, which do not provide a good ratio between the quantity of energy stockpiled and the mass of these accumulators. The mileage in zero emission mode is thus slight in relation to the payload of the vehicle.

SUMMARY

The purpose of the present invention is in particular to avoid these drawbacks of the prior art, and to provide a solution allowing a hybrid vehicle to have a substantial energy stockpile in relation to the payload by utilizing the hydraulic energy to power this vehicle.

For this, the present disclosure provides a traction chain for the drive wheels of a hybrid vehicle, comprising a heat engine as well as a hydraulic traction machine powered by hydraulic accumulators, constituting two power units making it possible to drive the drive wheels of the vehicle, and additionally it comprises a recharge module including electricity storage batteries connected to an electric machine, which drives a hydraulic recharge machine that powers the hydraulic accumulators, and a means for controlling this recharge module connected to the means for controlling the power units of the vehicle.

One advantage of this traction chain is that the electricity storage batteries, having a better storage capacity as compared to hydraulic accumulators and for a given weight, can supply a larger quantity of energy, which boosts the travel range of the vehicle, especially when driving with the heat engine halted.

The traction chain of the invention, furthermore, can have one or more of the following features, which can be combined with each other:

Advantageously, the hydraulic traction machine has its two power supply channels connected to a high-pressure hydraulic accumulator and to a low-pressure hydraulic accumulator.

Advantageously, the hydraulic recharge machine has its two power supply channels connected each to one of the high and low pressure hydraulic accumulators.

According to one embodiment, the hydraulic recharge machine has a variable cubic capacity that is regulated by the means of controlling the recharge module.

Advantageously, the recharge module has an electric valve which allows isolation of the hydraulic circuit of this module from the hydraulic circuit of the hydraulic traction machine.

Advantageously, the recharge module constitutes an independent subassembly that is mounted in the traction chain.

Another object of the invention is methods of operation of a traction chain having any one of the previous features, and comprising the following operating modes.

A first operating mode allows recharging of the hydraulic accumulators, the vehicle being halted or in motion, by driving the hydraulic recharge machine used as a pump from the electric machine consuming an electric current delivered by the batteries.

A second operating mode makes it possible to recharge the batteries by driving the electric machine, supplying an electric current to charge these batteries from the hydraulic recharge machine used as a motor, receiving energy from the hydraulic accumulators, which are themselves recharged by the hydraulic traction machine during the braking phases of the vehicle.

A third operating mode is implemented when the recharge module is no longer in service, by closing the isolating electric valve.

Moreover, the object of the invention is a hybrid vehicle having a traction chain comprising a heat engine and a hydraulic traction machine powered by hydraulic accumulators, constituting two power units making it possible to drive the drive wheels of this vehicle, this traction chain having any one of the preceding features.

DRAWINGS

The invention will be better understood and other features and advantages will appear more clearly upon reading the following specification, given as an example and not limiting, with regard to the enclosed drawings.

DETAILED DESCRIPTION

Figure 1:
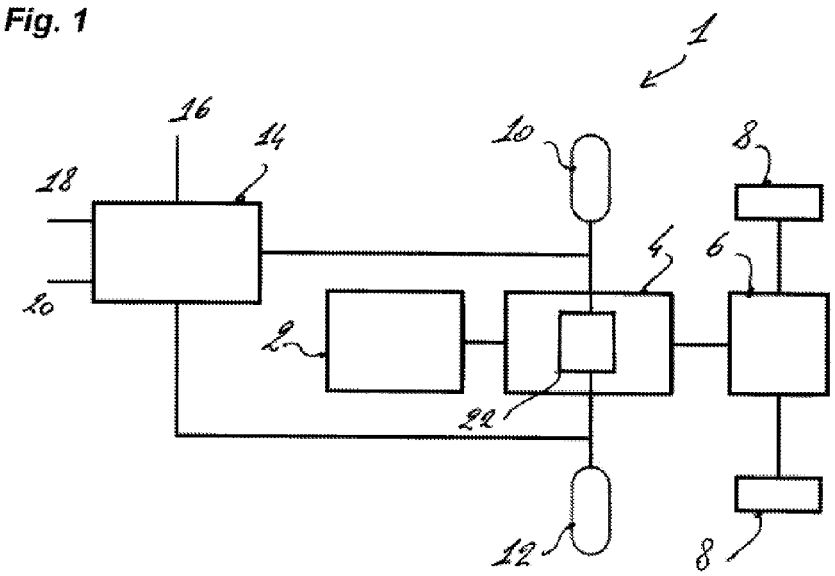
FIG. 1 is a diagram of a traction chain of a hybrid vehicle according to the invention, having a recharge module.

FIG. 1 presents a traction chain 1 of an automobile, comprising a heat engine 2, driving a mechanical transmission 4 connected to a differential 6, transmitting and distributing the movement to two drive wheels 8 of an axle, which can be the front wheels, the rear wheels, or all the wheels of the vehicle.

The mechanical transmission 4 has a hydraulic traction machine 22 which can work as a motor or as a hydraulic pressure generator, one fluid outlet channel being connected to a high-pressure hydraulic accumulator 10, and the other to a low-pressure hydraulic accumulator 12. The hydraulic traction machine 22 displaces the fluid toward the low 12 or high pressure 10 hydraulic accumulator to respectively work as a motor consuming the energy of the high-pressure accumulator 10 and furnish a mechanical power, or to work as a pump and recharge the high-pressure accumulator 10.

A shaft of the hydraulic traction machine 22 is connected to the mechanical transmission 4, so as to be able to drive the drive wheels 8 of the vehicle. The heat engine 2 as well as the hydraulic traction machine 22 can be connected so that they form power units arranged in series, in parallel, in series and in parallel alternately, or in power branching, depending on the different known configurations for the arrangement of a traction chain 1 of a hybrid vehicle.

As a variant, the heat engine 2 can drive the front wheels of the vehicle, and the hydraulic traction machine 22 the rear wheels.

The traction chain 1 moreover contains a recharge module 14 of the hydraulic accumulators 10, 12, able to furnish a hydraulic pressure in these accumulators 10, 12 to recharge them, or to consume the hydraulic pressure of these accumulators 10, 12.

The recharge module 14 contains a link 16 to the electrical control network of the vehicle, a connection 18 to the public current distribution network, and a current outlet 20 providing an alternating voltage of 220 V.

Figure 2:
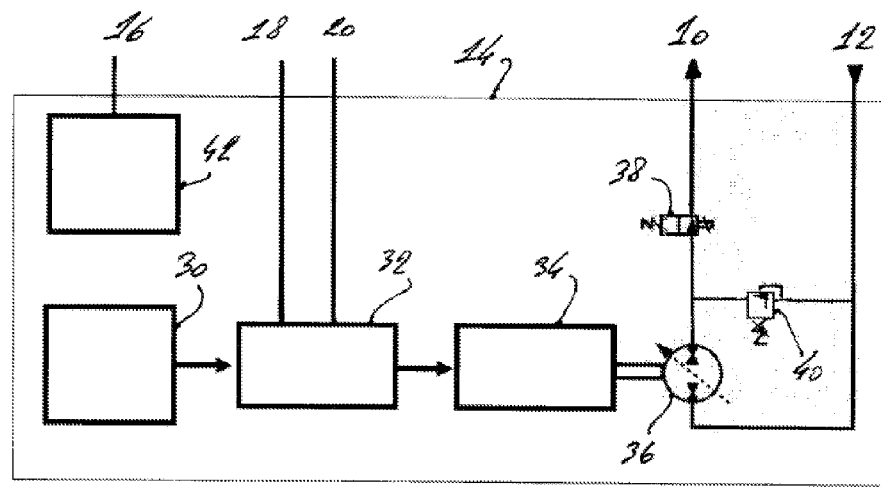
FIG. 2 is a diagram of this recharge module in a first operating mode.

FIG. 2 details the recharge module 14, comprising electricity storage batteries 30, which can contain, for example, electrochemical accumulators or high-capacity capacitors, which are connected to a power electronics 32.

The power electronics 32 transforms the current received from the batteries 30 to supply it to an electric machine 34, and regulate the machine 34 when it is working as a motor. The power electronics 32 also transforms the current received from this electric machine 34 when it is working as a generator, to recharge the batteries 30.

For this and the following figures, the arrows connecting the batteries 30, the power electronics 32 and the electric machine 34, as well as those placed at the hydraulic circuit 10, 12, represent the direction of energy transfer.

The electric machine 34 has a shaft connected to a hydraulic recharge machine 36 able to work as a pump or as a hydraulic motor, having a fixed cubic capacity or a variable cubic capacity.

The hydraulic recharge machine 36 having a variable cubic capacity is regulated by a control computer 42 of the recharge module 14. Advantageously, the hydraulic recharge machine 36 with variable cubic capacity comprises axial pistons driven by a swash plate whose inclination is controllable to adjust this cubic capacity.

The hydraulic recharge machine 36, when working as a pump driven by the electric machine 34, as shown in FIG. 2, receives the fluid from the low-pressure accumulator 12 and transfers it to the high-pressure hydraulic accumulator 10, passing through an electric valve 38 which is open. In this case, there is a recharging of hydraulic energy in the high-pressure hydraulic accumulator 10 from the electric energy contained in the batteries 30.

The hydraulic circuit of the recharge module 14 furthermore contains a pressure limiter 40 arranged between the power supply channels of the hydraulic recharge machine 36, which makes it possible to limit the pressure difference to a maximum value in order to ensure safety in case of an incident in the system. In particular, it makes it possible to limit the pressure in the event that the electric machine 34 continues to furnish a power with the electric valve 38 closed, or with the high-pressure accumulator 10 completely filled.

The control computer 42 of the recharge module 14 exchanges information as to the status of the vehicle by the link 16 with the electric control network of the hybrid power units 2, 22, in particular, to regulate the power electronics 32, the variable cubic capacity of the hydraulic recharge machine 36, and the electric valve 38.

The control computer 42 in particular exchanges information as to the level of energy contained in the hydraulic accumulators 10, 12 and in the batteries 30, so as to optimize these levels and let the heat engine 2 operate in the best performance conditions.

The connection 18 with the public current distribution network is connected to the power electronics 32 to receive energy from the public current distribution network when the vehicle is hooked up to public current distribution network while parked, and to transform the energy so as to recharge the batteries 30.

The current outlet 20, on the contrary, receives electric current from the batteries 30, which is transformed by the power electronics 32 into alternating current of 220 V, in order to operate the accessories plugged into the vehicle.

The operating mode of FIG. 2 provides for recharging of the hydraulic accumulators 10, 12 when the vehicle is halted or in motion from electric current furnished by the batteries 30. It will be noted that the batteries 30 having a higher energy level for a given weight than that of hydraulic accumulators 10, 12, the travel range of the vehicle in zero emission mode is greater than that of a hybrid vehicle without a recharge module 14.

Figure 3:
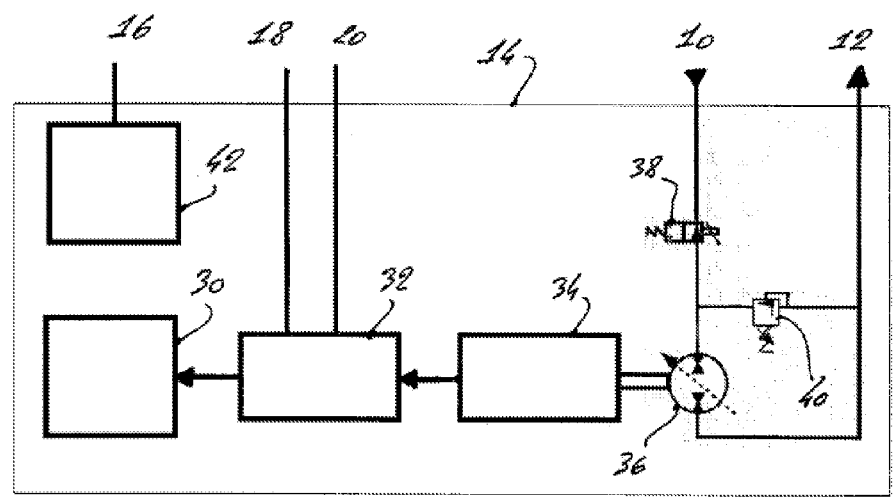
FIG. 3 is a diagram of this recharge module in a second operating mode.

The operating mode of FIG. 3 provides receipt of the hydraulic energy coming from the operation of the transmission 4, the high-pressure accumulator 10 furnishing a fluid in the hydraulic recharge machine 36 operating as a hydraulic motor, passing through the electric valve 38 which is open, to drive the electric machine 34 working as a generator, and to recharge the batteries 30.

In particular, the kinetic energy coming from the braking of the vehicle can be recovered, during a slowdown of this vehicle or during the descent of a slope, which is converted into hydraulic energy by the hydraulic traction machine 22, then into electric energy by the hydraulic recharge machine 36 used as a motor to drive the electric machine 34, which produces current stockpiled in the batteries 30.

In the same way, the quantity of energy stockpiled in the batteries 30 is greater than that in hydraulic accumulators 10, 12 of equivalent weight, which allows a greater recovery of energy.

Figure 4:
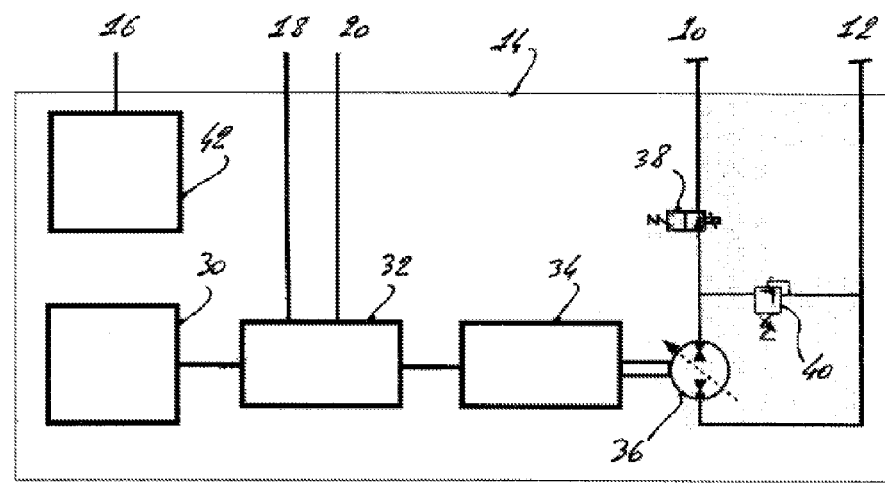
FIG. 4 is a diagram of this recharge module in a third operating mode.

The operating mode of FIG. 4 is used when the recharge module 14 is no longer in service, especially when the charge of the batteries 30 no longer allows for the exchange of energy with the hydraulic accumulators 10, 12.

In this case, the control computer 42 of the recharge module 14 closes the electric valve 38 to isolate the hydraulic circuit of this module and prevent a leakage flow in the hydraulic recharge machine 36 so as not to cause a loss of energy stored in the hydraulic accumulators 10, 12.

It will be noted that the recharge module 14 can constitute an independent subassembly, which is mounted on a hybrid vehicle comprising a transmission 4 having a hydraulic traction machine 22, to boost the travel range of this vehicle when driving without polluting gas. In this way, the recharge module 14 can constitute a subassembly that is easily installed on the vehicle by connecting the hydraulic channels and the electrical connections.

The invention claimed is:

1. A traction chain for the drive wheels of a hybrid vehicle, said traction train comprising:
    a heat engine and a hydraulic traction machine, the hydraulic traction machine connected to a high-pressure hydraulic accumulator and a low-pressure hydraulic accumulator, the heat engine structured and operable to drive wheels of the vehicle, and hydraulic traction machine structured and operable to displace fluid from the high-pressure hydraulic accumulator toward the low-pressure hydraulic accumulator such that the hydraulic traction machine works as a motor and furnishes mechanical power the drive wheels, and receive mechanical power from the drive wheels to work as a pump and recharge the high-pressure accumulator;
    a recharge module that includes an electric machine, electricity storage batteries connected to the electric machine, and a hydraulic recharge machine, the hydraulic recharge machine structured and operable to receive mechanical power from the electric machine to work as a pump and recharge the high-pressure and low-pressure accumulators, and consume hydraulic pressure from the high-pressure and low-pressure accumulators to deliver mechanical power to the electric machine, whereby the electric machine generates electricity to recharge the electricity storage batteries, wherein the hydraulic recharge machine includes:
        two power supply channels each connected to one of the high-pressure hydraulic accumulator and the low-pressure hydraulic accumulators; and
        a variable cubic capacity that is regulated by the means of controlling the recharge module; and
    a means for controlling the recharge module connected to a means for controlling the heat engine and a hydraulic traction machine of the vehicle, wherein the recharge module is an independent subassembly that is mounted in the traction chain.

2. The traction chain according claim 1, wherein the recharge module includes an electric valve structured and operable to isolate the hydraulic circuit of the recharge module from the hydraulic circuit of the hydraulic traction machine.

3. A method of operation of a traction chain, wherein the traction chain includes a heat engine and a hydraulic traction machine connected to and powered by a fluid transfer between a high-pressure hydraulic accumulator and a low-pressure hydraulic accumulator, the heat engine and hydraulic traction machine structured and operable to drive wheels of the vehicle, a recharge module including an electric machine, electricity storage batteries connected to the electric machine, a hydraulic recharge machine, and a means for controlling the recharge module connected to a means for controlling the heat engine and a hydraulic traction machine of the vehicle, wherein the recharge module is an independent subassembly that is mounted in the traction chain, wherein the hydraulic recharge machine includes:
    two power supply channels each connected to one of the high-pressure hydraulic accumulator and the low-pressure hydraulic accumulators; and
    a variable cubic capacity that is regulated by the means of controlling the recharge module, said method comprising:
    operating the traction chain in a first operating mode, wherein the hydraulic recharge machine receives mechanical power from the electric machine and works as a pump to recharge the high-pressure and low-pressure accumulators, the vehicle being one of halted or in motion, consuming an electric current delivered by the batteries; and
    operating the traction chain in a second operating mode, wherein the hydraulic recharge module consumes hydraulic pressure from the high-pressure and low-pressure accumulators to deliver mechanical power to the electric machine, whereby the electric machine generates electricity to recharge the electricity storage batteries.

4. The method of operation of a traction chain according to claim 3 further comprising implementing a third operating mode when the recharge module is no longer in service, by closing an isolating electric valve.

5. A hybrid vehicle, said vehicle comprising:
    a traction chain, wherein the traction chain includes:
        a heat engine and a hydraulic traction machine, the hydraulic traction machine connected to a high-pressure hydraulic accumulator and a low-pressure hydraulic accumulator, the heat engine structured and operable to drive wheels of the vehicle, and hydraulic traction machine structured and operable to displace fluid from the high-pressure hydraulic accumulator toward the low-pressure hydraulic accumulator such that the hydraulic traction machine works as a motor and furnishes mechanical power the drive wheels, and receive mechanical power from the drive wheels to work as a pump and recharge the high-pressure accumulator;
        a recharge module that includes an electric machine, electricity storage batteries connected to the electric machine, and a hydraulic recharge machine, the hydraulic recharge machine structured and operable to receive mechanical power from the electric machine to work as a pump and recharge the high-pressure and low-pressure accumulators, and consume hydraulic pressure from the high-pressure and low-pressure accumulators to deliver mechanical power to the electric machine, whereby the electric machine generates electricity to recharge the electricity storage batteries, wherein the hydraulic recharge machine includes:
            two power supply channels each connected to one of the high-pressure hydraulic accumulator and the low-pressure hydraulic accumulators; and
            a variable cubic capacity that is regulated by the means of controlling the recharge module; and
        a means for controlling the recharge module connected to a means for controlling the heat engine and a hydraulic traction machine of the vehicle, wherein the recharge module is an independent subassembly that is mounted in the traction chain.

* * * * *